(12) United States Patent
La Roche

(10) Patent No.: US 11,251,988 B2
(45) Date of Patent: Feb. 15, 2022

(54) AGGREGATING BANDWIDTH ACROSS A WIRELESS LINK AND A WIRELINE LINK

(71) Applicant: Cisco Technology, Inc., San Jose, CA (US)

(72) Inventor: Humberto Jose La Roche, Ocean, NJ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 87 days.

(21) Appl. No.: 16/262,538

(22) Filed: Jan. 30, 2019

(65) Prior Publication Data

US 2020/0244477 A1    Jul. 30, 2020

(51) Int. Cl.
| | |
|---|---|
| H04L 12/24 | (2006.01) |
| H04L 12/28 | (2006.01) |
| H04L 29/08 | (2006.01) |
| H04W 88/10 | (2009.01) |
| H04W 80/02 | (2009.01) |

(52) U.S. Cl.
CPC ........ *H04L 12/2867* (2013.01); *H04L 69/321* (2013.01); *H04W 80/02* (2013.01); *H04W 88/10* (2013.01)

(58) Field of Classification Search
CPC ............. H04L 41/5061; H04L 12/2867; H04L 69/321; H04W 92/02; H04W 80/02; H04W 88/10
See application file for complete search history.

(56) References Cited

U.S. PATENT DOCUMENTS

| | | | |
|---|---|---|---|
| 2010/0195617 A1* | 8/2010 | Park ...................... | H04W 36/02 370/331 |
| 2011/0040888 A1 | 2/2011 | Krishnaswamy et al. | |
| 2011/0188398 A1* | 8/2011 | Baba ..................... | H04W 40/16 370/252 |
| 2012/0115480 A1* | 5/2012 | Takahashi ............. | H04W 36/08 455/436 |

(Continued)

OTHER PUBLICATIONS

Filipe Leitão et al., "Unified Control Plane: Converged Policy and Charging Control", IEEE Communications Magazine—Communications Standards Supplement, Mar. 2015, 5 pages.

(Continued)

*Primary Examiner* — Anez C Ebrahim

(57) ABSTRACT

Various implementations disclosed herein provide a method to aggregate bandwidth across a wireless link and a wireline link. The method includes obtaining a first set of data packets from client devices and determining whether to transmit the first set of data packets to a packet processing node. The method further includes generating a first set of adapted data packets by applying a first adaptation function. The method includes generating a first set of adapted data packets. While the first set of data packets do not satisfy a first suitability criterion, the first set of adapted data packets satisfy a first suitability criterion. The disclosed method further includes generating a first set of adapted data packets including aggregating the first set of data packets from the client devices. Finally, the disclosed method includes transmitting the first set of adapted data packets to the packet processing node.

20 Claims, 6 Drawing Sheets

(56) References Cited

U.S. PATENT DOCUMENTS

| | | | | |
|---|---|---|---|---|
| 2012/0294226 A1* | 11/2012 | Racz | ................... | H04B 7/2606 370/315 |
| 2013/0343288 A1* | 12/2013 | Ratasuk | ................ | H04W 52/38 370/329 |
| 2016/0218794 A1* | 7/2016 | Matsumoto | ........... | H04L 1/1685 |
| 2017/0164221 A1* | 6/2017 | Tan Bergstrom | ....... | H04W 8/02 |
| 2018/0343600 A1* | 11/2018 | Ma | ........................ | H04W 40/02 |

OTHER PUBLICATIONS

Anna Larmo et al., "The LTE Link-Layer Design", IEEE Communications Magazine, Apr. 2009, 8 pages.

3GPP Organizational Partners, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.4.0, Dec. 2018, 363 pages.

3GPP Organizational Partners, "3rd Generation Partnership Project; Technical Specification Group Radio Access Network; NR; NR and NG-RAN Overall Description; Stage 2 (Release 15)", 3GPP TS 38.300 V15.4.0, Dec. 2018, 97 pages.

China Mobile Research Institute, "C-RAN The Road Towards Green RAN", Version 1.0.0, Apr. 2010, 31 pages.

Jun Wu et al., "Cloud Radio Access Network (C-RAN): A Primer", IEEE Network, Jan./Feb. 2015, 7 pages.

Dirk Wübben et al., "Benefits and Impact of Cloud Computing on 5G Signal Processing", IEEE Signal Processing Magazine, Nov. 2014, 10 pages.

Aleksandra Checko et al., "Cloud RAN for Mobile Networks—A Technology Overview", IEEE Communication Surveys & Tutorials, vol. 17, No. 1, First Quarter 2015, Mar. 13, 2015, 22 pages.

3GPP Organizational Partners, "3rd Generation Partnership Project; Technical Specification Group Radio Access Network; Evolved Universal Terrestrial Radio Access (E-UTRA); LTE-WLAN Aggregation Adaptation Protocol (LWAAP) specification (Release 15)", 3GPP TS 36.360 V15.0.0, Jul. 2018, 10 pages.

3GPP Organizational Partners, "3rd Generation Partnership Project; Technical Specification Group Radio Access Network; Evolved Universal Terrestrial Radio Access Network (E-UTRAN); X2 general aspects and principles (Release 15)", 3GPP TS 36.420 V15.0.0, Jun. 2018, 13 pages.

3GPP Organizational Partners, "3rd Generation Partnership Project; Technical Specification Group Radio Access Network; Evolved Universal Terrestrial Radio Access Network (E-UTRAN); X2 application protocol (X2AP) (Release 15)", 3GPP TS 36.423 V15.4.0, Dec. 2018, 409 pages.

3GPP Organizational Partners, "3rd Generation Partnership Project; Technical Specification Group Radio Access Network; Evolved Universal Terrestrial Radio Access Network (E-UTRAN); X2 data transport (Release 15)", 3GPP TS 36.424 V15.0.0, Dec. 2017, 9 pages.

Helka-Liina Määttanen et al., "LTE-WLAN aggregation (LWA) in 3GPP Release 13 & Release 14", IEEE Conference on Standards for Communications and Networking (CSCN), https://ieeexplore.ieee.org/document/8088625, Sep. 2017, 7 pages.

Pavan Nuggehalli et al., "LTE-WLAN Aggregation", IEEE Wireless Communications, Aug. 2016, 3 pages.

Sasha Sirotkin et al., "LTE-WLAN Aggregation (LWA): Benefits and Deployment Considerations", https://www.intel.com/content/www/us/en/wireless-network/lte-wlan-aggregation-deployment-white-paper.html, downloaded May 8, 2019, 22 pages.

4G Americas, "LTE Aggregation & Unlicensed Spectrum", Nov. 2015, 27 pages.

3GPP Organizational Partners, "3rd Generation Partnership Project; Technical Specification Group Radio Access Network; NR; Packet Data Convergence Protocol (PDCP) specification (Release 15)", 3GPP TS 38.323 V15.4.0, Dec. 2018, 26 pages.

Jeanette Wannstrom, "Carrier Aggregation explained", Jun. 2013, 7 pages.

* cited by examiner

AGGREGATING BANDWIDTH ACROSS A WIRELESS LINK AND A WIRELINE LINK

TECHNICAL FIELD

The present disclosure generally relates to wireless and wireline networks, and in particular, to aggregating bandwidth across a wireline link and a wireless link.

BACKGROUND

Techniques for aggregating bandwidth across wireline access links have existed for some time. For example, there is a complete family of inverse multiplexing solutions and specifications for Time Division Multiplexing (TDM) circuits and Asynchronous Transfer Mode (ATM). In the IP domain, Multipath Transmission Control Protocol (MP-TCP) is a technique for supporting a TCP connection across two paths. Two common techniques derived from 3GPP specifications are known as Carrier Aggregation (CA) and Dual Connectivity (DC).

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
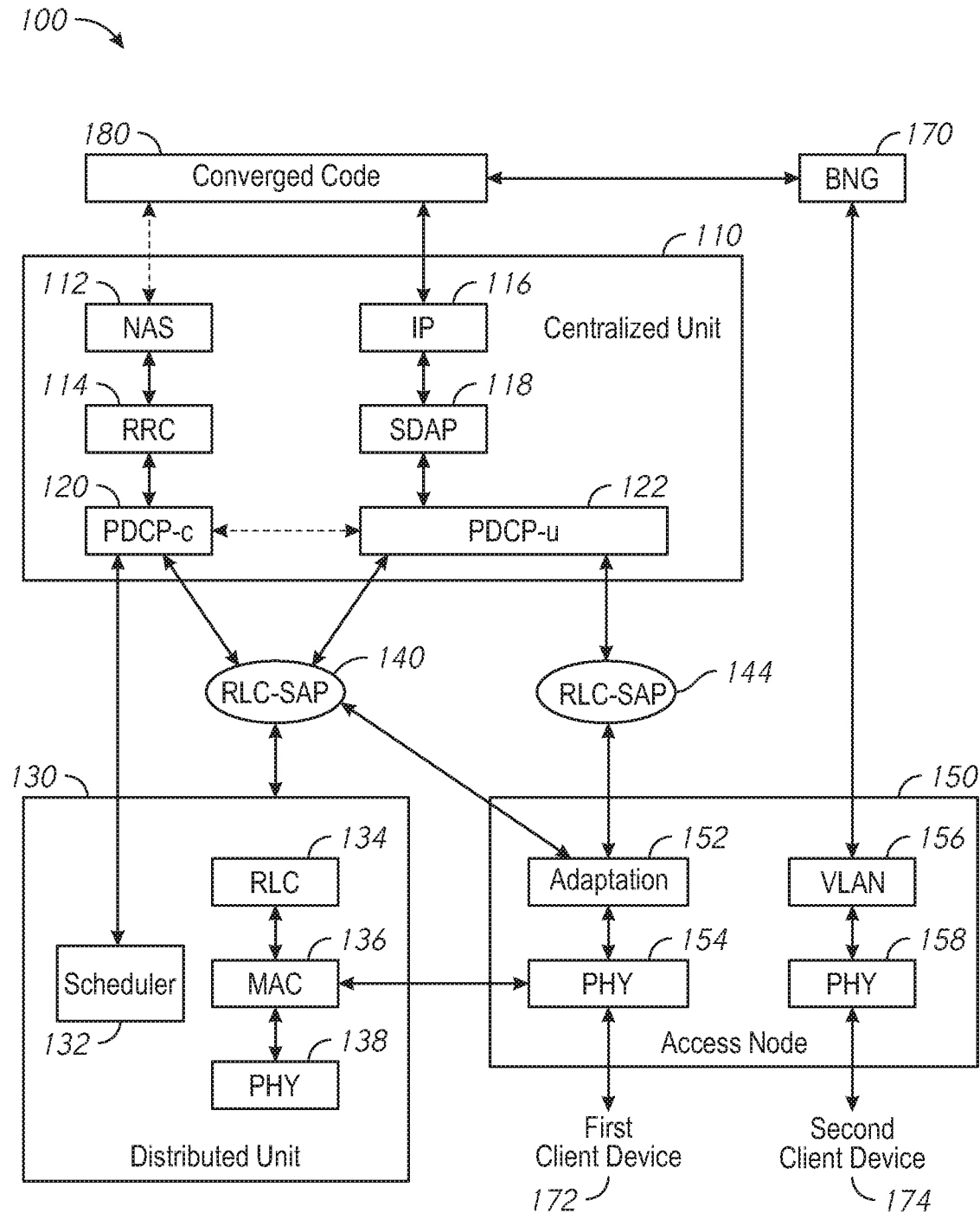
FIG. 1 is a block diagram of a system configured to aggregate bandwidth across a wireless link and a wireline link in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE IMPLEMENTATIONS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

OVERVIEW

Various implementations disclosed herein enable aggregation of bandwidth in both directions across of a wireless link and a wired link. In some implementations, a method is performed at an access node (e.g., at a wireline access node). In some implementations, the access node includes a wireline transceiver, one or more processors, and a non-transitory memory. In some implementations, the method includes obtaining a first set of data packets from one or more client devices. Further, the method includes determining whether to transmit the first set of data packets to a packet processing node. In some implementations, the packet processing node operates in accordance with a Packet Data Convergence Protocol (PDCP). In some implementations, the method includes, in response to determining that the first set of data packets are to be transmitted to the packet processing node, generating a first set of adapted data packets by applying a first adaptation function to the first set of data packets. In some implementations, the first set of data packets are so adapted to satisfy a first suitability criterion associated with the packet processing node. In some implementations, the method includes transmitting the first set of adapted data packets to the packet processing node.

In some implementations, the present disclosure provides methods, systems and devices for aggregation of bandwidth across both wireline access link and mobile access link. By aggregating bandwidth across a wireline access link and a mobile access link, while the bandwidth is enhanced, a more reliable connection is formed. Moreover, in case one of the wireless or wireline connections stops working, the other connection can work properly without overall connection failure. A consumer or enterprise user might deploy a customer premises equipment device supporting a mobile radio interface and a fixed wireline radio interface. The present application enables the client device to benefit from a common data link layer aggregating resources in the fixed wireline access and in the mobile access physical layers (PHY). In some implementations, the aggregation is performed at a PDCP layer. In some implementations, the aggregation is performed at a MAC layer. The benefits of the aggregation of PHY layers include greater peak bandwidth, and resiliency benefits where if one PHY layer fails, the other persists. The present disclosure provides methods, systems and/or devices for aggregating bandwidth across fixed wireline networks (e.g., DSL, cable, Ethernet, etc.) and mobile networks, particularity those based on LTE or 5G 3GPP standards. This application, which comes in two variants, seamlessly supports the IP protocol.

Disclosed herein is a method for aggregating bandwidth across a wireless access link and a wired access link including: obtaining a first set of data packets from one or more client devices. In various implementations, the client devices are wireless devices or wireline devices. The method further includes determining whether to transmit the first set of data packets to a packet processing node and generating a first set of adapted data packets by applying a first adaptation function to the first set of data packets. In various implementations, the method for aggregating bandwidth across a wireless access link and a wireline access link so generates a first set of adapted data packets that while the first set of data packets do not satisfy a first suitability criterion associated with the packet processing node, the first set of adapted data packets satisfy a first suitability criterion associated with the packet processing node. In various implementations, generating a first set of adapted data packets includes aggregating the first set of data packets from the client devices. The aggregating the first set of data packets are rendered via an RLC-SAP. Finally, the method for aggregating bandwidth across a wireless access link and a wireline access link includes transmitting the first set of adapted data packets to the packet processing node.

In various implementations, the method for aggregating bandwidth across a wireless access link and a wireline access link includes obtaining a second set of data packets from the packet processing node. The method for aggregating bandwidth across a wireless access link and a wireline access link further includes generating a second set of adapted data packets by applying a second adaptation function to the second set of data packets. In various implementations, the method for aggregating bandwidth across a wireless access link and a wireline access link so generates a second set of adapted data packets that while the second set of data packets do not satisfy a second suitability criterion associated with a wireline network, the second set of adapted data packets satisfy a second suitability criterion associated with the wireline network. In various implementations, generating a second set of adapted data packets includes aggregating the second set of data packets from the client devices. In some implementations, the aggregating the second set of data packets are rendered via a MAC-SAP. Finally, the method for aggregating bandwidth across a wireless access link and a wireline access link includes transmitting the second set of adapted data packets to the one or more client devices over the network.

EXAMPLE EMBODIMENTS

FIG. 1 is a block diagram of a network system 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the network system 100 may include a centralized unit 110, a distributed unit 130, an access node 150, a Broadband Network Gateway (BNG) 170, a first client device 172, a second client device 174, and a third client device 176.

In various implementations, the centralized unit 110 includes a Non-Access Stratum (NAS) 112, a Radio Resource Control (RRC) layer 114, an Internet Protocol (IP) layer 116, a Service Delivery Adaptation Protocol (SDAP) layer 118, a PDCP control function (PDCP-c function) 120 and a PDCP data function (PDCP-u function) 122. In some implementations, the NAS 112 has interfaces to both the local telecommunication service provider e.g., the phone company, and to the Internet backbone. In some implementations, the NAS 112 performs signaling between a network and a client device.

In various implementations, an RRC protocol is used to implement the methods, devices and/or systems described herein. RRC messages are transported via the PDCP-c function 120. In various implementations, the major functions of the RRC layer 114 include connection establishment and release functions, broadcast of system information, radio bearer establishment, reconfiguration and release, RRC connection mobility procedures, paging notification and release and outer loop power control. By means of the signaling functions the RRC layer 114 configures the user and control planes according to the network status and allows implementation of radio resource management strategies. In various implementations, Quality of Service (QoS) flows from the IP layer 116 to the PDCP-u function 122 through the SDAP layer 118. In various implementations, the PDCP-c function 120 and the PDCP-u function 122 provide services to the RRC layer 114 and user plane upper layers, (e.g., IP at the user equipment (UE) or to the relay at the base station). The services provided by PDCP functions 120 and 122 to upper layers include, but are not limited to, transfer of user plane data, transfer of control plane data, header compression, ciphering, and integrity protection. For example, if PDCP functions 120 and 122 are configured for No Compression, they send the IP packets without compression. Otherwise, the PDCP functions 120 and 122 compress the packets according to their configuration by upper layer and attach a PDCP header and send the packets. In various implementations, instructions from the PDCP-c function 120 to the adaptation function 152, and instructions from PCDP-u function 122 to an RLC layer 134 are transmitted over an RLC-SAP 140. In various implementations, instructions from PDCP-u function 122 are transmitted to the adaptation function 152 over an RLC-SAP 144.

In various implementations, the distributed unit 130 includes a scheduler layer 132, an RLC layer 134, a MAC layer 136 and a PHY layer 138. In various implementations, the distributed unit 130 is associated with a third client device 176. In various implementations, it is possible to distribute available transmission resources in frequency domain to different client devices. In some implementations, this allocation is changed dynamically once per subframe. For example, the allocation may be changed once per millisecond. In some implementations, the scheduler layer 132 is in charge of assigning radio links. In some implementations, the scheduler layer 132 can base its decision on the QoS class and the queuing delay of the available data, on the instantaneous channel conditions, or on fairness indicators.

In some implementations, the channel conditions in a wideband system vary over time. In some implementations, the channel conditions in a wideband system can differ in the frequency domain. If the client device provides sufficiently detailed channel-quality information, the scheduler layer 132 can perform channel-dependent scheduling in the time and frequency domain.

In some implementations, the retransmission occurs one round-trip time (e.g., 8 ms for frequency-division duplex) after the previous transmission attempt. In such implementations, the scheduler layer 132 can postpone retransmissions in favor of higher priority transmissions. In some implementations, the scheduler layer 132 selects the client device and decides which radio bearer to serve.

In some implementations, the MAC layer 136 is responsible for the functionalities such as scheduling operation sent from the scheduler layer 132 or random access. In some implementations, the MAC layer 136 delivers RLC protocol data units (PDUs, not shown) to the corresponding RLC layer 134. In some implementations, if the RLC layer 134 detects a gap in the sequence of received PDUs based on the RLC sequence number, the RLC layer 134 starts a reordering timer assuming that the missing data packet still is being retransmitted. In some implementations, the reordering timer expires. In such implementations, an RLC acknowledged-mode (AM) receiver sends a status message including the sequence number of the missing RLC PDU(s) to its transmitting RLC layers. In some implementations, the MAC layer 136 treats the RLC layer 134 status message as any other data.

In various implementations, the PHY layer 138 determines peak data rates. In various implementations, the PHY layer 138 determines latencies. In various implementations, the PHY layer 138 determines coverage.

In some implementations, the system for aggregating bandwidth across a wireless link and a wireline link provides a scheduling request (SR) mechanism. The SR conveys a single bit of information, indicating that the client device has new data to transmit. In some implementations, the SR is conveyed on a dedicated resource on the physical uplink-control channel (PUCCH). In some implementations, the SR mechanism is a random access-based SR (RA-SR), where the SR is indicated by performing an RA procedure. If the uplink of the client user is not time aligned, RA-SR must be used to re-establish time alignment. RA-SR also is used when no PUCCH resources were assigned to the client user.

In various implementations, the access node 150 includes an adaptation function 152, a first PHY layer 154 associated with the adaptation function 152 and a first client device 172, a Virtual Local Access Network (VLAN) 156 and a second PHY layer 158 associated with the VLAN 156 and a second client device 174. In some implementations, a PDCP layer is common to both wireline and wireless access Public Data Network (PDN) connections. In some implementations, there is an adaptation function 152 in the access node 150 designed to include the control function defined. In various implementations, the access node 150 connects to the centralized unit 110 via the RLC-SAP 144, which, in some implementations, is a networkable option 2 split modelled after the X2 reference point in 3GPP. The adaption function 152 is a feature in the access node 150 which is deployed with the intent to make the wireline network access integrate to the centralized unit 110. In various implementations, the adaptation function is used to "fake-out" to be a cellular carrier band. In various implementations, the adaptation function 152 applies a PDCP header to the data packets. In various implementations, upon a failed connection, the PDCP-c function 120 further sends instructions to the adaptation function 152 to remove a link between the wireless access and the wireline access. In various implementations, the adapted data packets of the first client device 172 and the data packets of the second client device 174 are transmitted to a converged code layer 180. In uplink scenario, the adaptation function 152 encodes the data packets from the first client device 172 toward the converged code layer 180.

In downlink scenario, the adaptation function 152 decodes the data packets toward the first client device 172. Similarly, for uplink scenario, various implementations of the present application disclose the adaptation function 152 so adapts the data packets that while the data packets do not satisfy a first suitability criterion associated with the centralized unit 110, the adapted data packets satisfy a first suitability criterion associated with the centralized unit 110. In various implementations, adapting data packets includes aggregating the data packets from the client devices. The RLC-SAP performs the aggregation of the data packets. As an example, for the downlink scenario, various implementations of the present application disclose the adaptation function 152 so adapts the data packets that while the data packets do not satisfy a second suitability criterion associated with the centralized unit 110, the adapted data packets satisfy a second suitability criterion associated with the centralized unit 110. In various implementations, adapting data packets includes aggregating the data packets from the client devices.

In some implementations, Carrier Aggregation (CA) is used to combine two or more carriers into one data channel to enhance the data capacity. In some implementations, CA is performed by taking two or more contiguous channels within the same frequency band (e.g., intra-band, contiguous). In some implementations, two or more non-contiguous channels within the same band (intra-band, non-contiguous) are combined.

In some implementations, the client devices are configured to utilize radio resources from two different eNBs connected via a non-ideal backhaul over the X2 interface. In some implementations, there is a Master eNB (MeNB), which maintains the control plane, and a Secondary eNB (SeNB). In various implementations, there is only one C-plane S1-MME connection per client device. In some implementations, RRC is established only via MeNB, which also controls the SeNB connection. In some implementations, user plane is split between both eNBs. In some implementations, there are two different DC solutions depending on where the split of the user plane is done. In an implementation, the user plane can be split in the Core Network (CN), so that MeNB and SeNB serve separate radio bearers. In an implementation, the user plane is split in the MeNB. In the latter case, the data of a different radio bearer can be transmitted via both the MeNB and the SeNB, so this offers higher flexibility.

In various implementations, the method for aggregating bandwidth across a wireless access link and a wired access link utilizes dual connectivity (DC), as defined by 3GPP for LTE and 5G. DC allows a client device to simultaneously transmit and receive data on multiple component carriers from two cell groups via a master eNB and a secondary eNB. DC can increase user throughput, provide mobility robustness, and support load-balancing among eNBs. Similar to carrier aggregation (CA), DC aims to utilize the radio resource within multiple carriers to improve client device throughput. The difference between DC and CA is in their application scenarios and hence their implementations. CA is applied for the scenarios where the backhaul between nodes is ideal, while DC is for non-ideal backhaul (e.g., relatively large delay between nodes). In the CA implementation, user traffic is split between carriers in MAC layer, while in the DC implementation, it is split in PDCP function. In DC, the data bearer which is split in PDCP function is called split bearer. CA and DC are not mutually exclusive, instead, they can be jointly implemented for the same UE. For example, there are multiple carriers in the master cell group (MCG) and multiple carriers in the secondary cell group (SCG). Therefore, CA can be implemented in MCG and SCG, respectively. The two streams of the split bearer can be transmitted via CA in MCG and CA in SCG. The configuration between the master eNB and the secondary eNB is independent. For example, the bandwidth, number of component carriers, frame structure of each carrier, etc. are independent. In control plane, there is only one connection and it is between Mobility Management Entity (MME) and the master eNB. RRC connection only terminates at master eNB and there is no RRC entity in the secondary eNB. All secondary eNB-related RRC configuration is transmitted to the master eNB which then transmits an RRC message to the UE. Various implementations of the present application open interfaces into the 5G and LTE signal processing stacks that are becoming possible owing to the introduction of CRAN.

In various implementations, the methods, systems and/or devices described herein utilize carrier aggregation in order to combine a number of separate carriers. The utilizing carrier aggregation allows to combine a number of separate LTE carriers, which subsequently, enables the network operators to increase the peak user data rates and overall capacity of their networks and to exploit fragmented spectrum allocations. In various implementations, the MAC layer 136 in the distributed unit 130 sends the instructions to the adaptation function 152 in the access node 150. In some implementations, CA can be applied to either the Frequency Division Duplex (FDD) or Time Division Duplex (TDD) variants of LTE and it can be used to combine carriers whether or not they are contiguous or even in the same frequency band. In some implementations, CA and DC can increase the number of component carriers and the total bandwidth supported in both the downlink and the uplink scenarios. In some implementations, CA can support a greater number of frequency bands and combinations of frequency bands. In some implementations, CA between cells can enhance the support of small cells and heterogeneous networks. In some implementations, CA can enable flexible aggregation of FDD and TDD LTE carriers.

In various implementations, the subscriber management framework that is used for convergence relies on a mobile core (e.g., an Evolved Packet Core (EPC) or a 5GC) instead of a classic BNG. An EPC is a framework for providing converged voice and data on a 4G LTE network. 2G and 3G network architectures process and switch voice and data through two separate sub-domains (e.g., circuit-switched for voice and packet-switched for data). EPC unifies voice and data on an IP service architecture and voice is treated as just another IP application. This allows operators to deploy and operate one packet network for 2G, 3G, WLAN, WiMAX, LTE and fixed access (e.g., Ethernet, DSL, cable and fiber). In some implementations, Mobility Management Entity (MME) manages session states and authenticates and tracks a user across the network. In some implementations, Serving Gateway (SGW) routes data packets through the access network. In some implementations, Packet Data Node Gateway (PGW) acts as the interface between the LTE network and other packet data networks and manages QoS and provides deep packet inspection (DPI). In some implementations, Policy and Charging Rules Function (PCRF) supports service data flow detection, policy enforcement and flow-based charging.

In a 5G core network, the architecture is split into the signaling plane and the user data plane. Different entities are responsible for the two planes to cleanly separate them. In a 5GC, network entities are so defined that they can be virtualized.

In various implementations, a BNG function 170 serves as the access point for clients, through which they connect to the broadband network. When a connection is established between the BNG function 170 and the second client device 174, the second client device 174 can access the broadband services provided by the Network Service Provide (NSP) or Internet Service Provider (ISP). The BNG function 170 establishes and manages the second client device 174 sessions. When a session is active, the BNG function 170 aggregates traffic from various client device sessions from an access network, and routes it to the network of the service provider. In various implementations, the BNG function 170 is deployed by the service provider and is present at the first aggregation point in the network, e.g., the edge router. In some implementations, an edge router is configured to act as the BNG function 170. Because the subscriber directly connects to the edge router, the BNG function 170 effectively manages the client device's access, and the client device management functions e.g., authentication, authorization and accounting of subscriber sessions, address assignment, security, policy management and QoS. In various implementations, the BNG router not only performs the routing function but also communicates with authentication, authorization, and accounting (AAA) server to perform session management and billing functions. This makes the BNG solution more comprehensive.

In general, the goal of the BNG architecture is to enable the BNG router to interact with peripheral devices and servers, in order to provide broadband connectivity to clients (e.g., the second client device 174) and manage subscriber sessions.

The reason for preferring a mobile core over a BNG function is that it is easier to specialize the mobile platform to fixed access than it is to augment a fixed platform to support mobile. For example, even if the second client device 174 is stationary (e.g., not moving), varying network conditions and radio link failures induce handovers and those should be compensated for by the mobile infrastructure.

Various implementations of the system for aggregating bandwidth across a wireless access link and a wireline access link work with multiple types of access networks. In various implementations, the access node (AN) in a wireline network is the vehicle that provides the access-specific broadband termination on the network side. Examples of access nodes include Digital Subscriber Line Access Multiplexers (DSLAMs), Passive Optical Network (PON) Optical Line Terminals (OLTs), and Cable Modem Termination Systems (CMTSs). A DSLAM is a network device, usually at a telephone company central office, that receives signals from multiple client DSL connections and puts the signals on a high-speed backbone line using multiplexing techniques. Depending on the product, DSLAM multiplexers connect DSL lines with some combination of ATM, frame relay, or Internet protocol networks. For example, DSLAM enables a phone company to offer business or homes users the fastest phone line technology (e.g., DSL) with the fastest backbone network technology (e.g., IP). A PON is a telecommunications technology used to provide fiber to the client, both domestic and commercial. A PON's distinguishing feature is that it implements a point-to-multipoint architecture, in which unpowered fiber optic splitters are used to enable a single optical fiber to serve multiple end-points. The end-points are often individual clients, rather than commercial clients. A PON does not have to provision individual fibers between the hub and client device. PONs are often referred to as the "last mile" between an ISP and client.

A PON consists of an OLT at the service provider's central office (e.g., hub) and a number of optical network units (ONUs) or optical network terminals (ONTs), near clients. A PON reduces the amount of fiber and central office equipment required compared with point-to-point architectures and is a form of fiber-optic access network. A CMTS is a piece of equipment, typically located in a cable company's headend or hub-site, which is used to provide high speed data services, e.g., cable Internet or Voice over Internet protocol, to cable subscribers. A CMTS provides many of the same functions provided by the DSLAM in a DSL system.

A subscriber line is a presentation of traffic from the wireline part of a single client device. In conventional terms, it corresponds to an access line on a DSLAM, a fiber optic link on a PON OLT, or a VLAN on a CMTS trunk interface. In various implementations, the client device supports, for the wireline access, any Ethernet bridging protocol model to the AN. In various implementations, Ethernet bridging is over Point-to-Point Protocol (PPP), Generic Routing Encapsulation (GRE), encapsulate a wide variety of network layer protocols inside virtual point-to-point links over an Internet protocol network), or any other protocol.

In various implementations, PPP is a data link layer (layer 2) communications protocol used to establish a direct connection between two nodes. PPP connects two routers directly without hosts or other networking devices in between. PPP can provide connection authentication, transmission encryption and compression. PPP is used over many types of physical networks including serial cable, phone line, trunk line, cellular telephone, specialized radio links, and fiber optic links. ISPs have used PPP for customer dial-up access to the Internet, since IP packets cannot be transmitted over a modem line on their own, without some data link protocol. Two derivatives of PPP, Point-to-Point Protocol over Ethernet (PPPoE) and Point-to-Point Protocol over ATM (PPPoA), are used most commonly by ISPs to establish a DSL Internet service connection with customers.

In various implementations, the client device for mobile access further supports a standard 3GPP model as in LTE or New Radio (NR). In various implementations, a multi-connected client device is allowed to interwork with a mobile packet core. The mobile packet core (e.g., an EPC) is a single termination point for subscriber management in an EPC and a wireline access.

Figure 2:
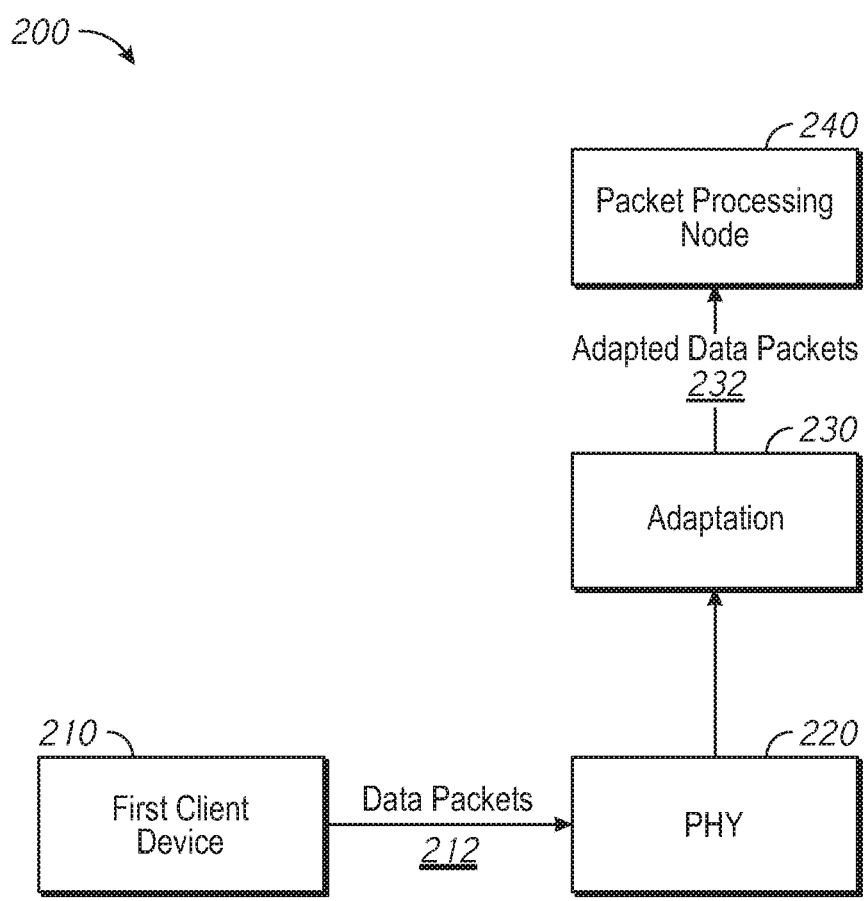
FIG. 2 is a block diagram illustrating the adaptation of data packets in an uplink scenario according to various implementations of the present application.
Figure 3:
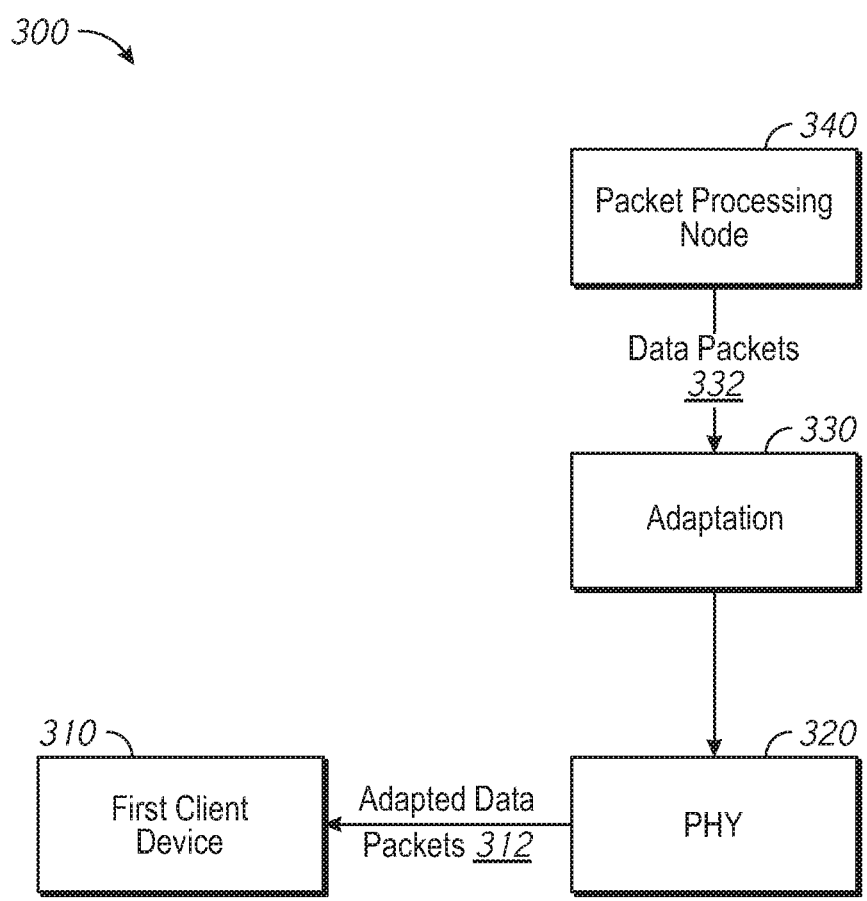
FIG. 3 is a block diagram illustrating the adaptation of data packets in a downlink scenario according to various implementations of the present application.

FIGS. 2 and 3 are block diagrams illustrating the adaptation process according to various implementations of the present application. FIG. 2 depicts an uplink scenario 200 when data packets 212 are received from a first client device 210. The PHY layer 220 transmits the data packets 212 to the adaptation function 230 (e.g., the adaptation function 152 shown in FIG. 1). In some implementations, the data packets 212 are so adapted (adapted data packets 232 as shown in FIG. 2) based on the packet processing node 240 instructions. In some implementations, the adaptation function 230 encodes the data packets 212 toward the packet processing node 240. In various implementations, the adaptation function 230 so adapts the data packets 212 that while the data packets do not satisfy a first suitability criterion associated with the packet processing node 240, the adapted data packets satisfy a first suitability criterion associated with the packet processing node 240.

FIG. 3 depicts a downlink scenario 300 when data packets 332 are sent from a packet processing node 340 to an adaptation function 330. In some implementations, the adaptation function 330 decodes the data packets 332 toward the first client device 310. In various implementations, the adaptation function 330 so adapts the data packets that while the data packets do not satisfy a second suitability criterion associated with the wireline network, the adapted data packets satisfy a second suitability criterion associated with the wireline network. In some implementations, the data packets 332 are so adapted (adapted data packets 312 as shown in FIG. 3) based on the packet processing node 340 instructions. The PHY layer 320 layer transmits the adapted data packets 312 to the first client device 310.

Figure 4:
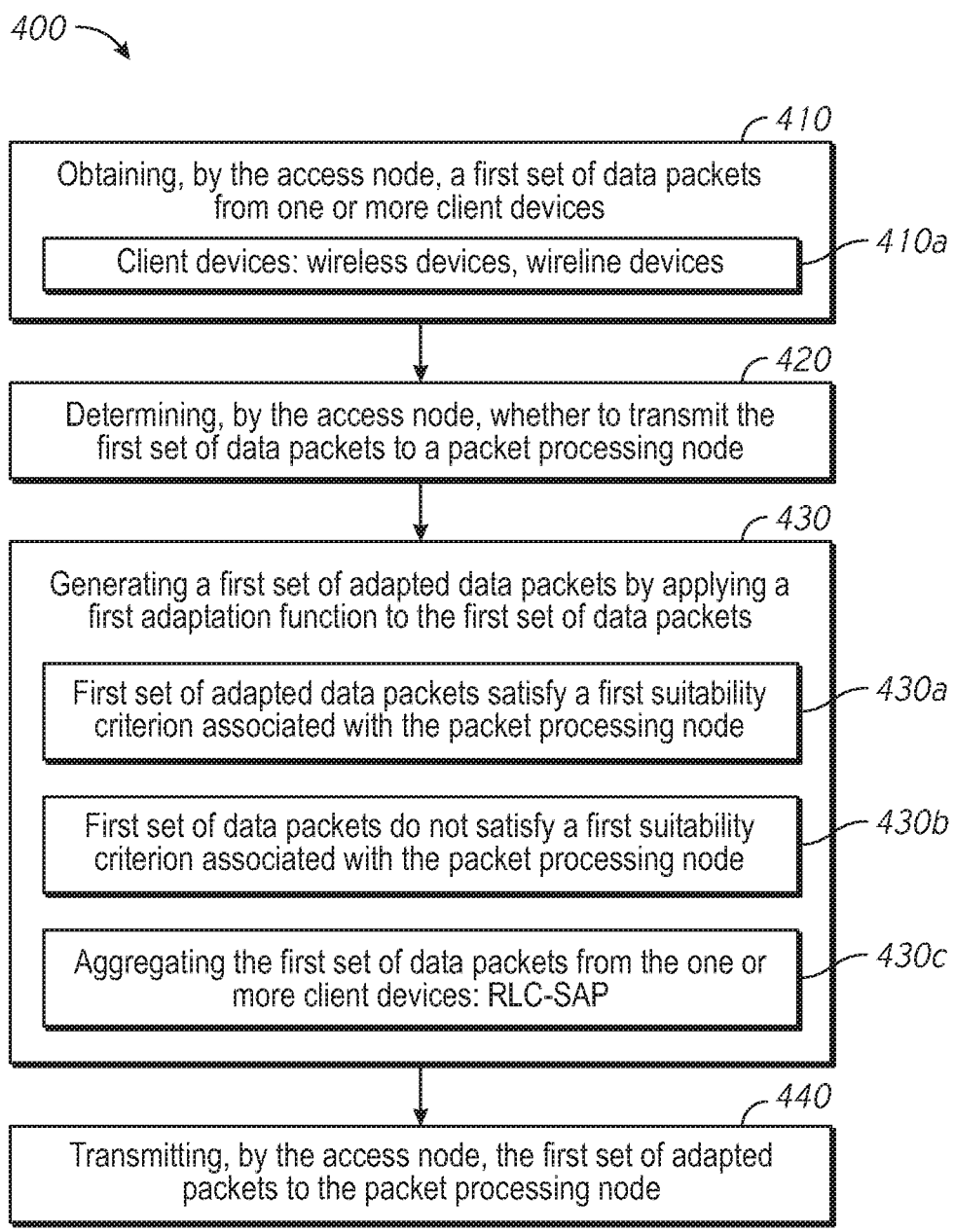
FIG. 4 is a flowchart representation of a method to aggregate bandwidth across a wireless link of the present application.

FIG. 4 is s flowchart representation of a method 400 for aggregating bandwidth across a wireless link and a wireline link. Referring to FIG. 4, and for uplink scenario, as represented by block 410, the method for aggregating bandwidth across a wireline link and a wireless link includes obtaining a first set of data packets from one or more client devices.

In various implementations, the one or more client devices are wireless devices or wireline devices, as shown at block 410a. At block 420, the method 400 includes determining whether to transmit the first set of data packets to a packet processing node. At block 430, the method 400 includes generating a first set of adapted data packets by applying a first adaptation function to the first set of data packets. In various implementations, the method 400 includes generating a first set of adapted data packets that while the first set of data packets do not satisfy a first suitability criterion associated with the packet processing node (as shown at block 430b), the first set of adapted data packets satisfy a first suitability criterion associated with the packet processing node (as shown at block 430a). In various implementations, generating a first set of adapted data packets includes aggregating the first set of data packets from the client devices. The RLC-SAP performs the aggregation of the first set of data packets, as shown at block 430c. Finally, as shown at block 440, the method 400 includes transmitting the first set of adapted data packets to the packet processing node.

Figure 5:
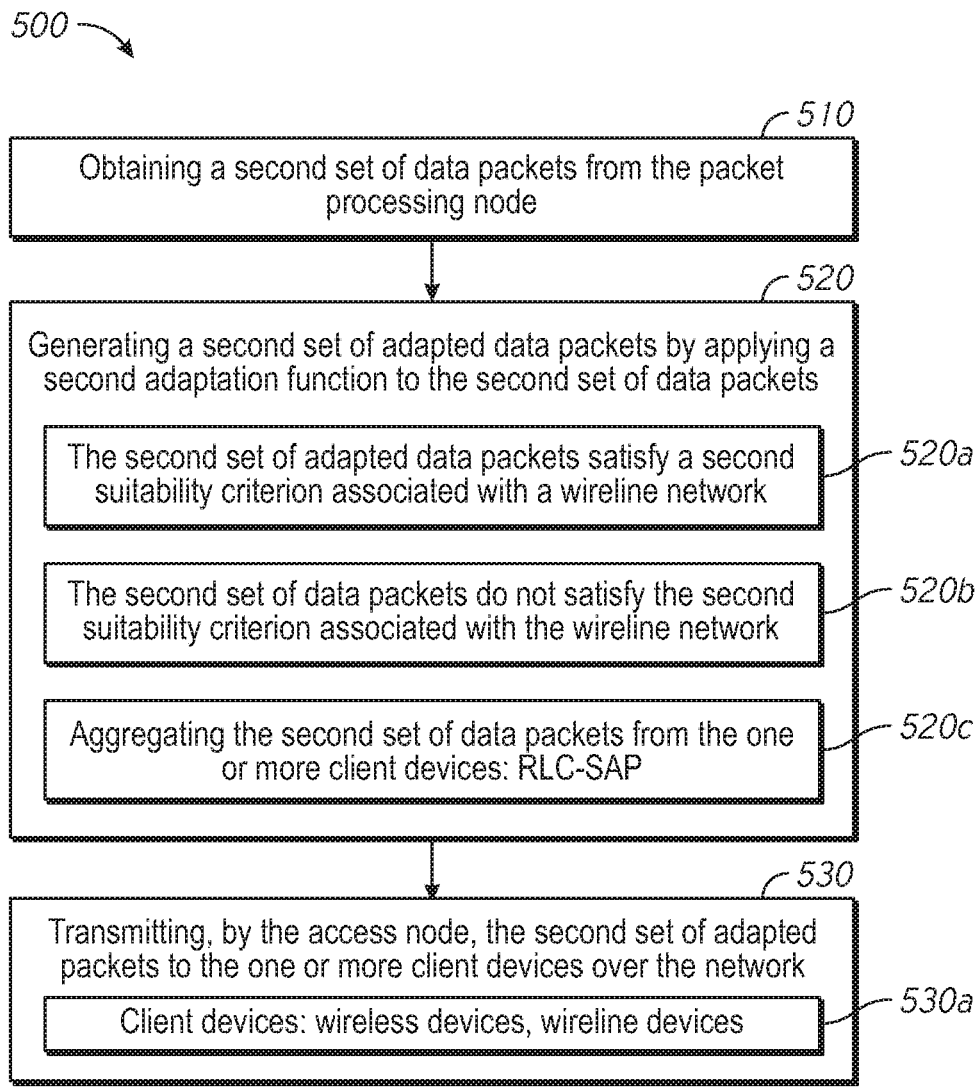
FIG. 5 is a flowchart representation of a method to aggregate bandwidth across a wireline link of the present application.

FIG. 5 illustrates a flowchart representation of a method 500 for aggregating bandwidth across a wireline link and a wireless link. Referring now to FIG. 5, for a downlink scenario, as shown at block 510, the method 500 includes obtaining a second set of data packets from the packet processing node.

At block 520, the method 500 includes generating a second set of adapted data packets by applying a second adaptation function to the second set of data packets. In various implementations, the method 500 includes generating a second set of adapted data packets that while the second set of data packets do not satisfy a second suitability criterion associated with a wireline network (as shown at block 520b), the second set of adapted data packets satisfy a second suitability criterion associated with the wireline network (as shown at block 520a). In various implementations, generating a second set of adapted data packets includes aggregating the second set of data packets from the client devices. The RLC-SAP performs the aggregation of the second set of data packets, as shown at block 520c. In some implementations, the MAC-SAP performs aggregation of the second set of data packets. Finally, as shown at block 530, the method 500 includes transmitting the second set of adapted data packets to the one or more client devices over the network. In various implementations, the client devices include wireless devices and wireline devices, as shown at block 530a.

Figure 6:
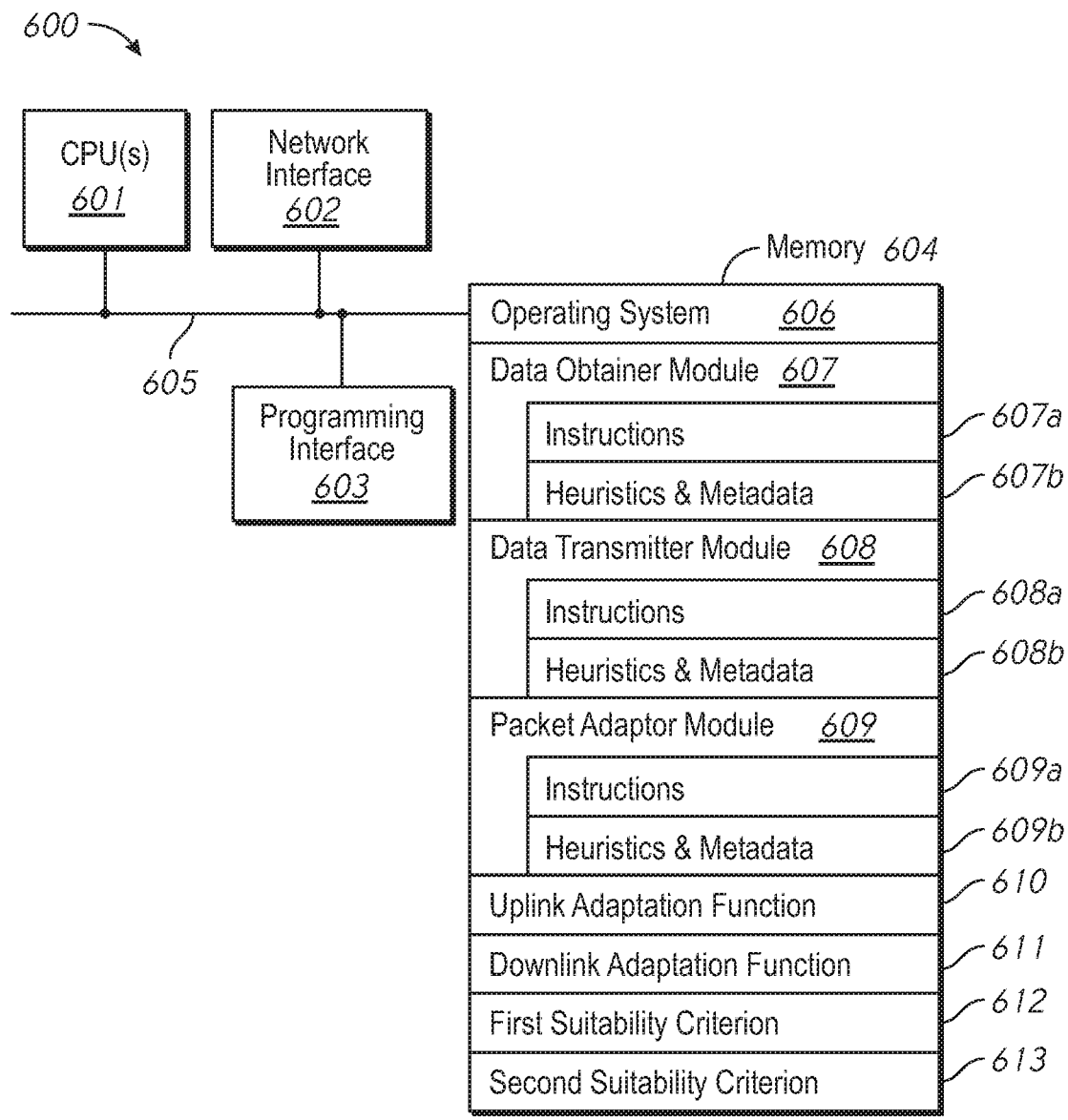
FIG. 6 is a block diagram of a device that aggregates bandwidth across a wireless link and a wireline link in accordance with some implementations.

FIG. 6 is a block diagram of a server system 600 enabled with various modules associated with and/or included in a system for aggregating bandwidth across a wireline link and a wireless link in accordance with some implementations. In other words, in some implementations, the server system 600 implements aggregating bandwidth across a wireline link and a wireless link. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 600 includes one or more processing units (CPUs) 601, a network interface 602, a programming interface 603, a memory 604, and one or more communication buses 605 for interconnecting these and various other components. In some implementations, the network interface 602 includes a wireless network interface.

In some implementations, the network interface 602 includes a wireline network interface.

In some implementations, the network interface 602 is provided to, among other uses, establish and maintain a metadata tunnel between a cloud-hosted network management system and at least one private network including one or more compliant devices. In some implementations, the one or more communication buses 605 include circuitry that interconnects and controls communications between system components. The memory 604 includes high-speed random-access memory, e.g., DRAM, SRAM, DDR RAM or other random-access solid-state memory devices, and may include non-volatile memory, e.g., one or more magnetic disk storage devices, optical disk storage devices, flash memory devices, or other non-volatile solid-state storage devices. The memory 604 optionally includes one or more storage devices remotely located from the one or more CPUs 601. The memory 604 comprises a non-transitory computer readable storage medium.

In some implementations, the memory 604 or the non-transitory computer readable storage medium of the memory 604 stores the following programs, modules and data structures, or a subset thereof including an optional operating system 606, a data obtainer module 607, a data transmitter module 608, a packet adaptor module 609, an uplink adaptation function 610, a downlink adaptation function 611, a first suitability criterion 612, and a second suitability criterion 613. In various implementations, the packet adaptor module 609 performs substantially the same operations as the adaptation function 152 shown in FIG. 1.

The operating system 606 includes procedures for handling various basic system services and for performing hardware dependent tasks. In various implementations, a data obtainer module 607 obtains data packets from the client devices or the packet processing node. To that end, in various implementations, the data obtainer module 607 includes instructions and/or logic 607a, and heuristics and metadata 607b.

In various implementations, the data transmitter module 608 transmits data packets to the client devices or the packet processing node. To that end, the data transmitter module 608 includes instructions and/or logic 608a, and heuristics and metadata 608b.

In various implementations, the packet adaptor module 609 adapts the set of data packets. To that end, the packet adaptor module 609 includes instructions and/or logic 609a, and heuristics and metadata 609b.

In various implementations, the packet adaptor module adapts the set of data packets received from the client devices (via the uplink adaptation function 610) or from the packet processing node (via the downlink adaptation function 611) based on the first suitability criterion 612 (uplink scenario). In various implementations, the packet adaptor module 609 adapts the set of data packets received from the client devices (via the uplink adaptation function 610) or from the packet processing node (via the downlink adaptation function 611) based on the second suitability criterion 613 (downlink scenario).

In some implementations, the methods, devices and/or systems described herein utilize operations described in User Equipment (UE) standards for 5G and NR. For example, the methods, devices and/or systems described herein utilize operations described in TS 36.101, which is incorporated herein by reference in its entirety. In some implementations, the methods, devices and/or systems described herein utilize operations described in networking standards for 5G and/or NR. For example, the methods, devices and/or systems described herein utilize operations described in TS 36.300 (LTE) and/or TS 38.300 (NR), which are incorporated herein by reference in their entirety.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented, and/or a method may be practiced using any number of the aspects set forth herein. In addition, such an apparatus may be implemented, and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
 at an access node including a wireless transceiver, one or more processors, and a non-transitory memory:
  obtaining, by the access node, a first set of data packets from one or more client devices, wherein the access node interconnects with a network gateway associated with a wireline network and a packet processing node associated with a wireless access;

determining, by the access node, whether to transmit the first set of data packets to the packet processing node;

in response to determining that the first set of data packets are to be transmitted to the packet processing node, generating a first set of adapted data packets by applying a first adaptation function to the first set of data packets, wherein applying the first adaptation function includes applying a Packet Data Convergence Protocol (PDCP) header to the first set of data packets and the first set of adapted data packets satisfy a first suitability criterion associated with the packet processing node;

transmitting, by the access node, the first set of adapted data packets to the packet processing node;

obtaining a second set of data packets from the packet processing node;

generating a second set of adapted data packets by applying a second adaptation function to the second set of data packets, wherein the second set of adapted data packets satisfy a second suitability criterion for the wireline network; and transmitting the second set of adapted data packets from the access node to the one or more client devices over the wireline network.

2. The method of claim 1, wherein the packet processing node operates in accordance with a Dual Connectivity protocol.

3. The method of claim 1, wherein the packet processing node operates in accordance with a Carrier Aggregation protocol.

4. The method of claim 1, wherein generating the first set of adapted data packets comprises aggregating the first set of data packets from the one or more client devices.

5. The method of claim 4, wherein aggregating the first set of data packets is performed through one or more service access points (SAP).

6. The method of claim 1, wherein the one or more client devices are wireless or wireline devices.

7. The method of claim 1, wherein the second suitability criterion is based on a wireline network protocol.

8. The method of claim 7, wherein the wireline network protocol is a Point-to-Point Protocol over Ethernet (PPPoE) connection.

9. The method of claim 1, wherein generating the second set of adapted data packets comprises aggregating the second set of data packets from the packet processing node.

10. The method of claim 9, wherein aggregating the second set of data packets is performed through one or more service access points (SAP).

11. A non-transitory computer storage that stores executable program instructions that, when executed by one or more computing devices associated with an access node, cause the access node to:

obtain a first set of data packets from one or more client devices, wherein the access node interconnects with a network gateway associated with a wireline network and a packet processing node associated with a wireless access;

determine whether to transmit the first set of data packets to a packet processing node;

in response to determining that the first set of data packets are to be transmitted to the packet processing node, generate a first set of adapted data packets by applying a first adaptation function to the first set of data packets, wherein applying the first adaptation function includes applying a Packet Data Convergence Protocol (PDCP) header to the first set of data packets and the first set of adapted data packets satisfy a first suitability criterion associated with the packet processing node;

transmit the first set of adapted data packets to the packet processing node;

obtain a second set of data packets from the packet processing node;

generate a second set of adapted data packets by applying a second adaptation function to the second set of data packets, wherein the second set of adapted data packets satisfy a second suitability criterion for the wireline network; and transmit the second set of adapted data packets from the access node to the one or more client devices over the wireline network.

12. The non-transitory computer storage of claim 11, wherein the packet processing node operates in accordance with a Dual Connectivity protocol.

13. The non-transitory computer storage of claim 11, wherein the packet processing node operates in accordance with a Carrier Aggregation protocol.

14. The non-transitory computer storage of claim 11, wherein the one or more client devices are wireless or wireline devices.

15. The non-transitory computer storage of claim 11, wherein the second suitability criterion is based on a wireline network protocol.

16. The non-transitory computer storage of claim 15, wherein the wireline network protocol is a Point-to-Point Protocol over Ethernet (PPPoE) connection.

17. An access node comprising:

at least one memory element for storing data; and at least one processor for executing instructions associated with the data, wherein executing the instructions causes the access node to perform operations, comprising:

obtaining, by the access node, a first set of data packets from one or more client devices, wherein the access node interconnects with a network gateway associated with a wireline network and a packet processing node associated with a wireless access;

determining, by the access node, whether to transmit the first set of data packets to the packet processing node;

in response to determining that the first set of data packets are to be transmitted to the packet processing node, generating a first set of adapted data packets by applying a first adaptation function to the first set of data packets, wherein applying the first adaptation function includes applying a Packet Data Convergence Protocol (PDCP) header to the first set of data packets and the first set of adapted data packets satisfy a first suitability criterion associated with the packet processing node;

transmitting, by the access node, the first set of adapted data packets to the packet processing node;

obtaining a second set of data packets from the packet processing node;

generating a second set of adapted data packets by applying a second adaptation function to the second set of data packets, wherein the second set of adapted data packets satisfy a second suitability criterion for the wireline network; and transmitting the second set of adapted data packets from the access node to the one or more client devices over the wireline network.

18. The access node of claim 17, wherein generating the first set of adapted data packets comprises aggregating the first set of data packets from the one or more client devices.

19. The access node of claim 17, wherein the second suitability criterion is based on a wireline network protocol.

20. The access node of claim 19, wherein the wireline network protocol is a Point-to-Point Protocol over Ethernet (PPPoE) connection.

* * * * *